Feb. 27, 1962 B. I. SEEGER 3,022,964
ACCELERATION AND MACH NUMBER LIMITING
FUEL CONTROLS FOR AIRCRAFT
Filed Feb. 23, 1954 3 Sheets-Sheet 1
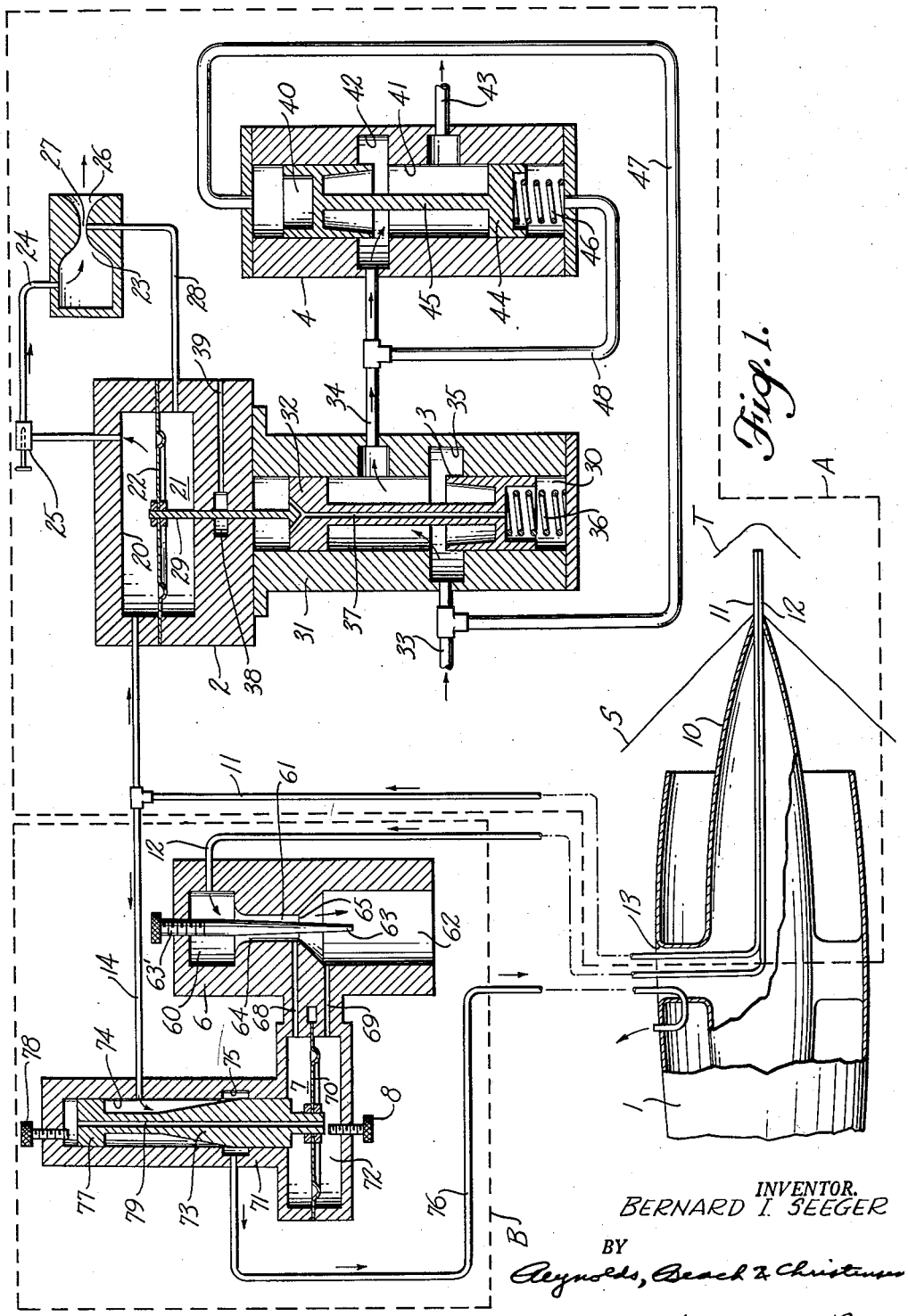
INVENTOR.
BERNARD I. SEEGER
BY
Reynolds, Beach & Christen
ATTORNEYS

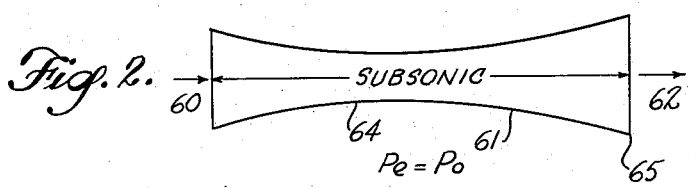
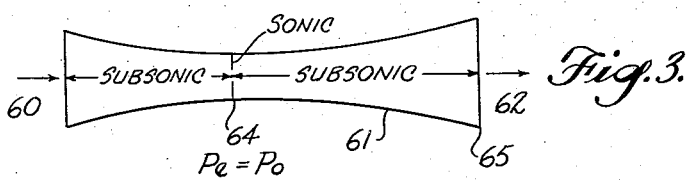
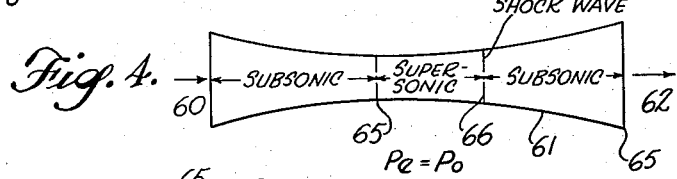
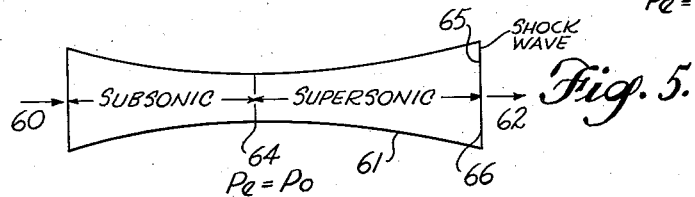
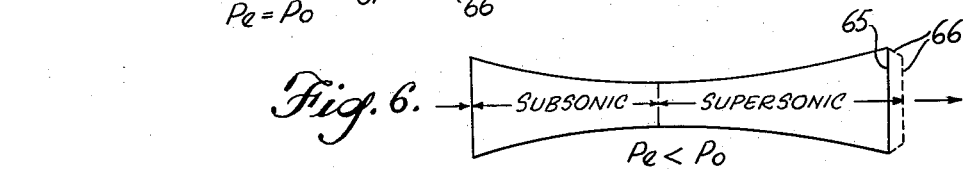
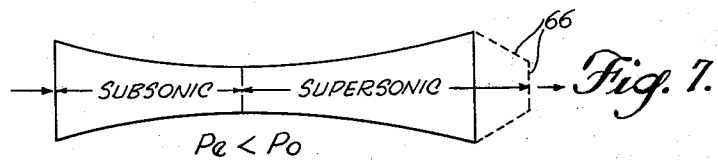
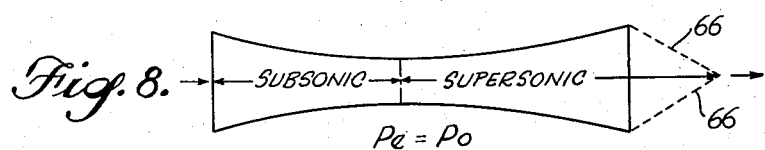
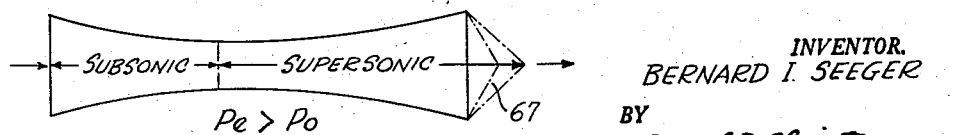
INVENTOR.
BERNARD I. SEEGER
BY
ATTORNEYS Feb. 27, 1962　　　　B. I. SEEGER　　　　3,022,964
ACCELERATION AND MACH NUMBER LIMITING
FUEL CONTROLS FOR AIRCRAFT
Filed Feb. 23, 1954　　　　　　　　　　3 Sheets-Sheet 3

INVENTOR.
BERNARD I. SEEGER
BY
Reynolds, Beach & Christensen
ATTORNEYS

United States Patent Office 3,022,964
Patented Feb. 27, 1962

3,022,964
ACCELERATION AND MACH NUMBER LIMITING FUEL CONTROLS FOR AIRCRAFT
Bernard I. Seeger, Seattle, Wash., assignor to Boeing Airplane Company, Seattle, Wash., a corporation of Delaware
Filed Feb. 23, 1954, Ser. No. 411,870
5 Claims. (Cl. 244—76)

The present invention relates to automatic mechanism for controlling the supply of fuel to the ramjet engine of an aircraft to maintain the fuel to air ratio under certain conditions at the optimum value to obtain maximum thrust from the engine and under other conditions to a lower value so as to obtain less than maximum thrust. Such control mechanism is particularly intended for use in a high speed aircraft such as a guided missile where booster rockets are used to accelerate the missile up to the point at which the ramjet engine starts. The present invention is used in such a missile to control a continuous flow of fuel to be mixed with air for combustion in the ramjet engine.

The primary functions of this type of fuel flow control equipment are: first, to regulate the fuel to air ratio of the ramjet engine so as to obtain maximum thrust from the engine as the aircraft accelerates up to a predetermined maximum Mach number; second, to reduce the fuel to air ratio of the ramjet engine when the maximum desired Mach number has been reached so as to reduce thrust from the engine and hold the aircraft speed at the desired maximum Mach number; and third, to limit the reduction of fuel to air ratio to a selected value even though the aircraft speed should exceed the predetermined maximum Mach number. A control having a somewhat similar function but of a specifically different type is disclosed in my co-pending application Serial No. 383,813, now Patent No. 2,872,133, for an Automatic Fuel Control for Regulating Aircraft Mach No. in Accordance with Change of Altitude.

Ramjet engine fuel flow controls which will perform the first named function, that of obtaining maximum thrust, have been known prior to this invention. An example of this type of control is that disclosed in a copending patent application, "Fuel Metering Devices for Ramjet Engines," by Daniel W. Gunnarson.

A primary function of the fuel control is to control the fuel flow rate so that it varies directly with impact pressure. In so doing the fuel control obtains a control force which is directly proportional to the impact pressure.

Where such a control is operating in a constant atmospheric pressure, its design can be based on comparing the impact pressure with atmospheric pressure, but in aircraft there is a considerable variation in ambient atmospheric pressure and the usual control of this nature compares the impact pressure with a spring acting within an evacuated bellows. Theoretically an evacuated bellows is satisfactory but in practice it has been found unreliable. Structural failure and consequent leakage are common, which destroys the evacuation. At best bellows are somewhat sensitive to altitude changes. Accurate bellows and spring characteristics are difficult to obtain because of variations in material and heat treatment.

A primary object of this invention therefore is to provide in a fuel-air ratio control device of the general function aforementioned, a device which will provide a control force which varies directly with the control pressure and yet will not utilize an evacuated bellows.

As outlined previously, a second function of a ramjet fuel control of this type is to reduce engine thrust at maximum Mach number so as to hold the aircraft speed at that value. This control therefore must be able to sense the maximum Mach number. Mach number can be measured in terms of the ratio of total impact pressure to static pressure. Pressure ratio sensing units of various designs have been built to measure the Mach number of airflow. Such pressure ratio sensing units usually depend upon the use of compound metallic bellows that require specialized techniques and facilities to build and evacuate, are costly, are not readily procurable with the exact properties required, and do not stand up well when subjected to vibration and extreme temperatures.

A second primary object of this invention therefore is to provide a Mach number sensing control which combines the features of simplicity, dependability, low cost, and which does not require the use of metallic bellows.

The third function of ramjet fuel controls of this type is to limit the reduction of fuel flow at maximum Mach number so as to keep the fire burning.

Although the absolute minimum fuel-air ratio compatible with sustained operation of the engine varies appreciably with environmental conditions, one practical embodiment of a lean limit control would function to prevent the Mach control from reducing the fuel-air ratio below a predetermined fraction of the rich-limit fuel-air ratio, regardless of flight speed, altitude or engine power conditions. The subject Mach number and rich-limit controls are especially adaptable to achievement of such lean-limit control objectives without the necessity of any additional moving parts.

Another object of this invention therefore is to provide in our ramjet engine fuel control, a simple dependable inexpensive lean limit control.

FIGURE 1 is a diagram of the control mechanism showing the control units in section, a representation of an aircraft housing with parts broken away, and piping interconnecting these units.

FIGURES 2 to 9, inclusive, are diagrammatic representations of a predetermined maximum Mach number sensing element incorporated in the auxiliary limiting Mach number control unit of FIGURE 1 and illustrating various air flow conditions.

Figure 12:
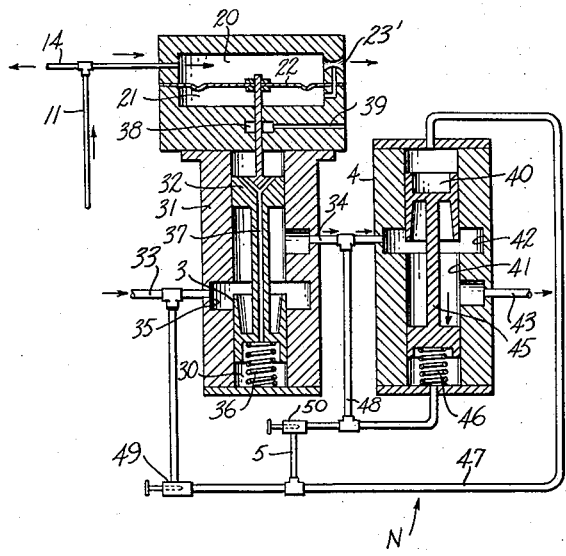
FIGURE 12 is a diagram of an alternate form of fuelflow regulating unit showing the control elements in section and the piping interconnecting them.

While an aircraft is not specifically shown in the drawings, it is to be understood that the jet engine housing 1 constitutes an integral portion of the aircraft which is suitably arranged relative to the rest of the aircraft to enable the engine to propel it. The cowling 10 projecting forwardly from the engine housing into the air stream constitutes a convenient mounting for at least one, and preferably two, ram or impact pressure probes 11 and 12. These probes, as shown, project forward beyond the engine housing into undisturbed air, but such a probe or probes might be mounted on any other suitable part of the aircraft. Conveniently, the probes or tubes are disposed side by side while being independent of each other, although the projecting probe could be in the form of a single tube, bifurcated within the housing 10. Also, the duct 13 is representative of any suitable passageway connecting the mounting for the probe or probes and the portion of the aircraft containing the fuel supply control mechanism.

It is desirable to project the tubes 11 and 12 into undisturbed air forward of the aircraft structure, because the control mechanism of this invention is of greatest value in the control of aircraft which normally cruise at sonic or supersonic speeds. At such speeds the pressure characteristics of ram air differ between the area ahead of and behind the shock wave produced by a large body moving through the air, such as the shock wave S caused by such movement of the engine housing 10. It is particularly desirable for the probes 11 and 12 of the present control mechanism to encounter undisturbed air, because a function of such control mechanism is usually to limit the speed of the aircraft to the range below a predetermined maximum Mach number, which is established with reference to undisturbed air, and the occurrence of such Mach number should therefore be sensed relative to air undisturbed by passage of the aircraft through it. Such location of the air probe will enable the control mechanism to effect the most consistent and accurate regulation of the aircraft speed.

At aircraft speeds less than the predetermined maximum Mach number, which will hereinafter be designated the critical Mach number, only that portion of the control mechanism within the broken-line boundary A will produce a controlling effect. The operation of this primary control mechanism is modified by operation of the auxiliary control mechanism shown in FIGURE 1 within the broken-line boundary B when the speed of the aircraft exceeds the critical Mach number. Consequently, the nature and operation of the primary control mechanism will be discussed first.

The purpose of the primary control mechanism is to enable the supply of fuel to the ramjet engine to be regulated automatically during flight from the point at which the ramjet is first ignited until accelerated to a desired cruising Mach number, which during such operation will maintain the fuel-to-air ratio of the mixture burned in the engine at substantially a constant value in order to obtain at maximum thrust, the best efficiency of combustion and maximum fuel economy. Obviously, setting a fuel valve at a constant opening will not afford a solution to this problem, especially in an engine of the ramjet type where the supply of air to the engine varies with the speed of the aircraft, increasing drastically from low velocities to supersonic velocities.

The primary control mechanism within the boundary A of FIGURE 1 functions to vary the fuel supply substantially in direct proportion to change of ram pressure, and consequently in proportion to the supply of air to a ramjet engine. Variations in the pressure of the fuel source are compensated by this mechanism, so as to have no appreciable ultimate effect on the quantity of fuel delivered to the engine. As the ramjet is ready for ignition, a predetermined minimum amount of fuel will be supplied to the engine so that the mixture will not be richer than a desired limiting value. As the flow of air through the engine increases with increase in speed of the aircraft, the fuel supplied will increase also and maintain the fuel-to-air ratio required for the engine to produce maximum thrust for the speed attained, and consequently the greatest acceleration.

Under the control simply of the primary fuel control mechanism it will be evident that the speed of the aircraft will continue to increase until its highest possible speed which can be developed with its engine or engines has been attained. Such speed, however, seldom is the most economical speed, and ordinarily is not desired. For this reason the auxiliary Mach number limiting control within the border B of FIGURE 1 is provided to modify the operation of the primary control mechanism at approximately the predetermined maximum desired Mach number. The function of such auxiliary control is to cause the primary control mechanism to reduce the supply of fuel to the engine and thus lean the combustible mixture, so that a smaller thrust is produced. Usually the reduction in thrust thus effected is sufficient so that the speed of the aircraft will stabilize at approximately the critical Mach number. Thus to reduce the engine thrust may, however, require such a decrease in the fuel-to-air ratio that the combustible mixture will be undesirably lean so as to impair the functioning of the engine. Consequently a limit can be placed on the proportionate reduction in supply of fuel at a limiting lean mixture, in which case the engine may develop sufficient thrust that the aircraft flight will stabilize at a Mach number somewhat higher than the predetermined maximum Mach number.

It will be evident that the auxiliary or Mach number limiting control should function accurately in response to changes in Mach number. Consequently, it is important that it be supplied with air under impact or ram pressure directly related to the aircraft Mach number and which is not affected by the supply of air to the primary control mechanism. For that reason the controlling air supply for the Mach number limiting control through the tube 12 shown in FIGURE 1 either should stem from a separate probe projecting into the free air stream forward of the supporting aircraft structure, as shown, or if a single probe is used to supply air to both the primary control mechanism air supply tube 11 and the tube 12, the junction of these tubes should be sufficiently close to the forward end of the probe, and they should be of such a size that reasonable fluctuations in flow of the air through tube 11 will not appreciably alter the pressure in or flow of air through tube 12 for any given Mach number. For purposes of discussion, therefore, it may be assumed that the impact air supplies for the primary control mechanism and for the Mach number limiting control mechanism are separate.

The primary fuel control mechanism includes a body 2 having a cavity divided into two chambers 20 and 21 by the diaphragm 22. The ram air supply tube 11 supplies air to the chamber 20 and such air is discharged through a convergent-divergent nozzle 23. Where such nozzle is a separate component, it may be connected to the chamber 20 by a conduit 24, flow through which can be regulated by a needle valve 25. The outlet 26 of this nozzle may discharge to atmosphere, but it is preferred that the throat 27 of the convergent-divergent nozzle or constricted nozzle be enough smaller than the outlet 26 as to cause the flow of air through the nozzle throat 27 to equal sonic velocity at reasonably low pressures in the inlet chamber of the nozzle.

From the throat 27 of the constricted nozzle, or from any location near such throat on the upstream side, a tube 28 leads to chamber 21 of the body 2. When the velocity of the air through the throat 27 equals Mach number 1, which may be expressed as the choking condition of the nozzle, the pressure of the air at that location bears a definite relationship to the pressure in chamber 20, which is the source of air flowing through the constricted nozzle. As the air pressure in chamber 20 varies, the pressure of the air in the nozzle throat also will vary, but such pressures will maintain accurate linear proportionality. The pressure upstream of the nozzle throat location 27, while varying progressively from valve 25 to the throat, will also be proportional to the pressure in chamber 20. By communicating the pressure at the nozzle throat to the chamber 21, therefore, the ratio of the air pressure in chamber 21 to the air pressure in chamber 20 as the impact air pressure varies will remain constant, and consequently the differential pressure acting on diaphragm 22 will vary in direct or linear proportion to the change in impact pressure to which tube 11 is exposed.

A stem 29, reciprocable in body 2, connects diaphragm 22 to the fuel control valve 3, sliding in bore 30 of a lower body 31. To assist in guiding the valve 3 for smooth linear reciprocation within the bore 30, a boss 32 is formed on the stem 29 at a location spaced a substantial distance from the valve 3. Between the valve 3 proper and the boss 32 a fuel inflow pipe 33 and a fuel outflow pipe 34 are connected. Inflow pipe 33 communicates directly with an annular recess 35 in the body 31 adjacent to the end of valve 3 closer to boss 32. The outlet pipe 34 is connected to the bore 30 between the annular recess 35 and the boss.

In order to minimize axial forces due to fuel flow acting on the valve 3, a deep recess is provided in its metering end, which leaves a thin annular edge cooperating with the sharp shouldered annular recess 35 to form an annular metering orifice, the flow through which varies substantially linearly with respect to valve displacement. Such valve movement is effected by an unbalance between the differential air pressure on opposite sides of diaphragm 22 and the opposing force of spring 36 reacting between the valve 3 and the body 31.

As has been mentioned, a principal purpose of the present control is to enable the speed of an aircraft to be maintained substantially at a limiting maximum Mach number. Mach number is the ratio of air impact or dynamic pressure divided by the static pressure for the particular altitude. At any given altitude the static pressure remains constant, and consequently flight of the aircraft may be maintained at a predetermined maximum Mach number if the dynamic air pressure remains constant. The control mechanism of the present invention, therefore, has been designed to govern the supply of fuel in direct or linear proportion to the dynamic air pressure. Thus, for an increased dynamic air pressure corresponding to a higher predetermined Mach number the supply of fuel will be increased correspondingly, and vice versa.

The function of the primary control mechanism, therefore, is to provide a control of fuel supply which will be related directly to dynamic or impact air pressure. Speaking generally, such impact air pressure is imposed upon the air supply tube 11. The pressures to which the opposite sides of diaphragm 22 are subjected, and consequently the effective differential pressure acting on such diaphragm, vary in direct proportion to changes in the dynamic air pressure. The diaphragm will effect movement of control valve 3 an amount directly proportional to the change in such differential pressure on diaphragm 22, which, as stated, reflects directly a change in impact pressure imposed on tube 11. Since the flow of fuel past valve 3 varies substantially directly with the change in valve position, the supply of fuel to the engine will be altered in direct proportion to the change in air impact pressure.

Thus, if twice as great a dynamic air pressure should be required for one selected Mach number over another, the pressure on tube 11 would be twice as great, the pressure difference on diaphragm 22 would be twice as great, the movement of valve 3 would be twice as great, and the flow of fuel past the valve 3 would be twice as great, assuming that there were no change in pressure of the fuel source or compensation were made for any such change in fuel pressure.

In order to effect movement of valve 3 solely as the result of an unbalance in the forces mentioned, it is desirable to eliminate any effects of air compression caused by such movement or fuel trapped in a cavity. Consequently an axial passage 37 is provided through stem 29 interconnecting the chamber in which the spring 36 is housed at the side of valve 3 remote from boss 32, and the chamber at the side of boss 32 remote from valve 3. Thus air and any fuel which may have leaked past either the valve or the boss are afforded free interchange between these two cavities. If fuel should leak beyond the portion of bore 30 closed by boss 32 toward air chamber 21 alongside valve stem 29, it will pass into a collecting cavity 38 from which it may escape through duct 39 and may be returned to the source of fuel supply.

The pressure of the fuel supply may vary, which would alter the linear relationship between the flow of fuel through the annular space metered by valve 3 and the displacement of such valve, and consequently a compensating control 4 is connected in series with the primary fuel control mechanism. This control is a conventional constant pressure drop valve in which there is a valve 40 slidable in a bore 41. Preferably this valve is of the same general type as valve 3, being recessed at its opposite ends to form a thin metering lip which will cooperate with a shouldered end of an annular cavity 42 in bore 41, to which the fuel pipe 34 is connected. The fuel is discharged from the bore 41 through a connection 43 spaced axially of the bore from the recess 42.

Also received in the bore 41 is a piston 44 spaced longitudinally of the bore from the valve 40 and connected to it by a valve stem 45. A spiral spring 46 is interengaged between such piston and the body of the fuel pressure compensating control, which exerts a force tending to move the piston, valve stem and valve toward open position.

Assuming that diaphragm 22 and valve stem 29 remain stationary, the flow of fuel through the restriction of valve 3 will change in the same sense as any change in pressure of the fuel source in pipe 33, and a corresponding change in pressure drop across the valve 3 will result. Thus if the fuel pressure increases, the flow through valve 3 will tend to increase, and the pressure drop across the valve will tend to increase. Pressure taps 47 and 48 connect the inlet and outlet of valve 3 to the opposing ends of control valve 40. The difference in pressure across valve 3 thus tends to close valve 40 in opposition to the force of spring 46.

As the pressure drop across valve 3 increases, therefore, resulting from an increase in pressure of the fuel supply, the valve 40 will be moved downwardly to restrict its opening. Conversely, if the fuel pressure decreases in pipe 33, thus reducing the pressure drop across valve 3, the force on valve 40 opposing spring 46 will be relieved, and valve 40 will move toward open position for the purpose of maintaining the flow of fuel from pipe 43 constant as long as the position of valve 3 remains unchanged.

The pressure drop across valve 3 will also be changed by alteration of its opening while the pressure of the fuel supply in pipe 33 remains constant. Thus if the opening of valve 3 decreases, the pressure drop across it will increase, producing a greater force on valve 40 opposing spring 46, so that this valve will be moved toward closed position also. Conversely, if valve 3 should be moved toward open position by movement of diaphragm 22 while the pressure of the fuel source remains constant, the pressure drop across valve 3 will decrease, resulting in a reduction in the force on valve 40 opposing the force of spring 46. As valve 3 opens, therefore, valve 40 also will open a related amount.

Assuming that the primary control mechanism is appropriate for the particular aircraft which is to be controlled, prior to take-off of the airplane the valve 3 will be in its most nearly closed position, because no air under ram pressure will be supplied to the engine. As the speed of the engine increases on take-off, more air will be delivered to the engine, and an increasing pressure will be exerted on the probe 11 and transmitted to the chamber 20 to which one side of diaphragm 22 is exposed. Long before the aircraft has reached the predetermined maximum Mach number the speed of airflow through the throat 27 of the constricted discharge nozzle will have reached the speed of sound, so that the pressure in diaphragm chamber 21 transmitted to it through tube 28 from the nozzle constriction will be a predetermined fraction of the air pressure in chamber 20. The difference in pressure of the air in chambers 20 and 21 will therefore deflect the diaphragm 22 to shift valve stem 29 in valve opening direction in opposition to the force produced by spring 36.

When this sonic flow is reached in nozzle 23, the flow through the nozzle is in what is termed the "choked"

condition and the nozzle 23 can thus be referred to as a choke 23.

As the metering lip of valve 3 is thus shifted farther from the shoulder of annular chamber 35 with which it cooperates, the flow of fuel from pipe 33 through the valve body to pipe 34 and hence to the engine supply pipe 43 will increase substantially in proportion to the movement of valve 3. As the speed of the aircraft increases, of course, the impact pressure of the air on probe 11, and consequently the air pressure delivered to chamber 20, will increase. The greater pressure in chamber 20 will, of course, also increase the pressure in and flow through the choke 23 so that the pressure transmitted by tube 28 to the diaphragm chamber 21 will increase. Because the pressures in chambers 21 and 20 vary in such a way that these pressures maintain a constant ratio relationship, although they are not equal, the pressure in chamber 20 will increase or decrease more than the pressure in chamber 21. The differences in the pressures in these two chambers which act on diaphragm 22 will therefore vary, and such variation will correspond substantially to the change in pressure in chamber 20, which is equal to the ram or impact pressure on probe 11 under flight conditions at less than critical Mach number. As the pressure difference on diaphragm 22 increases in response to an increase in pressure exerted on probe 11 the valve 3 will be moved progressively toward open position in opposition to the force exerted by spring 36. By such action, the flow of fuel through the valve unit will increase, of course, and such fuel flow will vary substantially in direct proportion to the axial movement of the valve 3, which in turn corresponds substantially linearly to the ram air pressure for velocities exceeding Mach 1. Assuming that the control 4 compensates for any variation in fuel pressure, the amount of fuel delivered by pipe 43 to the engine will therefore also be varied substantially in direct proportion to the change in ram pressure. Since the air supplied to the engine also varies directly with change in ram pressure, it will be seen that the ratio of fuel to air delivered to the engine will remain substantially constant as the aircraft Mach number varies within the range in which the primary control mechanism is in control.

One way of establishing the desired quantity of fuel supplied to the engine at any selected Mach number to produce the most effective fuel-to-air ratio is to choose a combination of springs 36 and 46 having the proper resiliency characteristics. The quantity of fuel supplied to the engine can also be varied, however, by altering the pressure differential produced on diaphragm 22 at a selected Mach number of the aircraft. Such pressure differential can be changed by adjusting needle valve 25 to vary the flow through the choke 23 and consequently the pressure in diaphragm chamber 21, which will alter the pressure differential acting on this diaphragm in opposition to the force of spring 36. Thus, if the needle valve 25 is moved toward closed position, the pressure differential on the diaphragm will be increased, and valve 3 will be moved toward open position to increase the flow of fuel to the engine and produce a richer mixture. Conversely, if the needle valve 25 is further retracted, the flow through the constricted nozzle 23 will be enlarged, and the pressure transmitted by tube 28 to the diaphragm chamber 21 will increase to reduce the pressure differential on diaphragm 22. Spring 36 will move valve 3 toward closed position in such case to decrease the supply of fuel to the engine, resulting in a leaner mixture.

Needle valve 25 is thus used as a very simple and dependable means of adjusting the factor or proportional relationship between impact pressure and control force as obtained by choke 23 in combination with diaphragm 22. Advantages of this simple combination of choke, valve, and diaphragm over other known adjustable fuel-air ratio control devices are: (1) lack of evacuated bellows; (2) adjusting device is not in critical flow area of the choke and therefore foreign matter or oil films will not adversely affect its dependability; and (3) a third advantage is that the construction of the choke and valve need not be held to close tolerances.

The fuel-to-air ratio to be maintained by the primary control mechanism at Mach numbers below the critical Mach number alternatively may be established by the control mechanism shown in FIGURE 12. In this modification the construction of the primary control mechanism and of the fuel pressure compensating control is the same as that illustrated in FIGURE 1 as described above, except that the fixed flow constricted nozzle 23′ discharging air from diaphragm chamber 20 is provided in the mechanism of FIGURE 12 instead of the adjustable flow nozzle arrangement 23, 24, 25, illustrated in FIGURE 1. Also, an additional fuel connecting pipe 5 is provided between the fuel by-pass pipes 47 and 48 and a needle valve 49 is interposed in the pipe 47 between the fuel supply pipe 33 and the connecting pipe 5. A needle valve 50 is included in the connection 5. Otherwise the control devices and their operation are the same as discussed above and the parts are numbered correspondingly.

In this type of fuel regulator the constricted nozzle 23′ will have a relationship of discharge area to throat area such that the air bled through this nozzle will reach sonic velocity at a low Mach number. If needle valve 50 is closed and valve 49 is reasonably far open, the mechanism shown in FIGURE 12 will operate in the same manner as the primary control mechanism and the fuel pressure compensating control shown in FIGURE 1, as described, provided that the spring 46 is selected so that it has resiliency characteristics corresponding to the desired fuel-to-air ratio.

In the modification shown in FIGURE 12 the valves 49 and 50 are used for adjustment of the primary control mechanism in place of valve 25 shown in FIGURE 1. However, in this case the adjustment means do not affect the proportional relationship between impact pressure and control force as does valve 25. Instead of performing this function, valves 49 and 50 obtain a like effect by allowing an adjustment of the fuel flow control valve arrangement so that, for any particular control force signal received from the primary control mechanism, the rate of fuel flow can be varied at will.

As mentioned before, the setting of valve 40 is effected directly by the pressure drop across valve 3. Valves 49 and 50 can be used to produce an apparent pressure drop through valve 3 which is different than the actual value and thus the initial setting of valve 40 can be varied for a given position of valve 3 to either increase or decrease the fuel flow corresponding to the impact pressure establishing such given position of valve 3, and thus to vary the fuel-to-air ratio of the ramjet engine.

In the adjustment device comprising valves 49 and 50 there is no flow through line 47 except insofar as the fluid must follow the movement of the valve 40 and from this it follows that changing the restriction afforded by valve 49 can only serve to dampen the action of the control as long as valve 49 is open and valve 50 is closed. However, as valve 50 is opened it will allow a limited flow from the fuel supply line 33 through valves 49 and 50 to the line 34 interconnecting valves 3 and 40 to increase the pressure acting against the lower end of valve 40. Changes in the setting of valves 49 and 50 will therefore vary the difference in pressure at the opposite ends of valve 40 to change its setting. The fluid pressure differential applied to opposite ends of valve 40 with this arrangement will always be a fixed fraction of the actual pressure drop across valve 3 with any fixed setting of valves 49 and 50.

When the aircraft speed has reached the critical or predetermined maximum Mach number, the operation of the primary control mechanism will be modified by the auxiliary Mach number limiting control to decrease the fuel-to-air ratio for reducing the engine thrust and consequently the speed of the aircraft. This result can be accomplished without altering the adjustment of any of the parts of the primary control mechanism and automatically simply by bleeding from the impact or ram pressure pick-up tube 11 a controlled amount of air such as to reduce the supply of air to diaphragm chamber 20, and consequently the pressure differential acting on diaphragm 22, the proper amount. To attain this result it is necessary that the Mach number limiting control mechanism initiate its control action at or near the critical Mach number value and that the control action exerted by the Mach number limiting control increase with increase in speed above such critical Mach number. To enable the Mach number limiting control to operate in this fashion a unique Mach number sensing element is utilized.

In considering the Mach number limiting control, it should, of course, be realized that the function of such control is to bleed air from the primary control mechanism impact pressure line under specified operating conditions, and consequently such Mach number limiting control mechanism is capable of use with various types of control mechanism which depend for their operation on air pressure ratios. Because the effect of the Mach number limiting control is to alter the impact air pressure supplied to the primary fuel control mechanism, and further because the operation of the Mach number limiting control should be related directly to changes in Mach number, a supply of flight impact air pressure by way of tube 12 must be available which is not appreciably affected by any factor other than the flight impact pressure. For that reason it is preferable, as shown, to supply such impact pressure by a separate probe extending beyond the aircraft structure, and which will produce its own shock wave line T at and above sonic velocities. Any other source of flight impact pressure may be utilized, however, provided that it is not appreciably affected by other considerations, such as supplying a fluctuating quantity of air to the tube 11 which leads to the primary control mechanism.

The preferred type of Mach number sensing element used in the auxiliary Mach number limiting control has no moving parts. As shown in FIGURE 1, it consists of a body 6 defining an entrance pressure chamber 60 with which the impact pressure tube 12 communicates, a nozzle passage 61 and an exit or static pressure chamber 62. This latter chamber communicates with static atmospheric pressure. Preferably a nozzle passage adjusting rod 63 extends axially through the nozzle passage 61 and includes a threaded end 63' screwed into a tapped aperture of the body 6 in alignment with the nozzle passage 61, so that it may be adjusted lengthwise of the nozzle. The portion of this rod extending through and beyond the nozzle passage is tapered toward its free end, so that such lengthwise movement of the adjusting rod will vary the cross-sectional area of the annular nozzle passage.

Whether the nozzle passage 61 is of circular or of annular cross section, the shape of the nozzle lengthwise will be first convergent and then divergent in the direction from the entrance chamber 60 to the exit chamber 62. Such a convergent-divergent or constricted nozzle for the purposes of the present invention further has a ratio of exit area to throat area such that above the critical Mach number of the airplane the pressure at the nozzle exit will exceed atmospheric pressure, that is, the pressure in the exit chamber 62. The throat of the nozzle is the junction between the convergent and the divergent portions of the nozzle or the point of greatest constriction in cross-sectional nozzle area, whether such cross section is of annular shape between the body 6 and the rod 63, as in the type of mechanism illustrated, or is of circular shape. The nozzle exit is the junction between the nozzle 61, which is the substantially restricted passage, and the static pressure chamber 62.

FIGURES 2 to 9, inclusive, illustrate the flow characteristics through a constricted nozzle of the type designated 61 in FIGURE 1 as the relationship of the pressure in the entrance chamber 60 to the static pressure in the chamber 62 varies. An understanding of such flow characteristics serves as a basis for the comprehension of the operation of the Mach number sensing device and its control function. Flow of air through the nozzle is produced, of course, by providing a higher air pressure in the entrance chamber 60 than in the exit chamber 62. The air then flows from left to right in FIGURES 2 to 9, and in general the velocity of flow through the constricted nozzle will depend upon the ratio of the air pressures in the entrance chamber and exit chamber.

In FIGURE 1 nozzle 61 has been shown greatly enlarged for clarity but in actuality the dimensions of the throat 64 are such as to create a major restriction to line 12. Flow through the nozzle is thus small in relation to the capacity of line 12 so that for all practical purposes the static pressure of the air in the nozzle inlet chamber is equal to total impact pressure at probe 12. This pressure is termed inlet total absolute pressure or $P_m$.

Likewise the nozzle outlet chamber 62 is enough larger than the nozzle proper that static pressure measured by port 69 is equal to ambient static pressure termed $P_o$.

Port 68 is so placed in the sidewall of nozzle 61 that the pressure of the air within it is at the absolute static pressure at the nozzle exit. This pressure is termed $P_e$.

According to simplified one-dimensional analysis of compressible fluid mechanics, the nozzle 61 will produce flow phenomena that are dependent largely upon the raio of $P_m/P_o$ which when increased from unity will effect a useful control phase in the ratio of $P_e/P_o$ as will be explained.

As the aircraft accelerates following takeoff, the ratio $P_m/P_o$ increases. Where this ratio $P_m/P_o$ is low, the flow of air through the nozzle 61 will be at subsonic velocities, as indicated in FIGURE 2, although the speed of the air flow through the nozzle will accelerate from the nozzle entrance to the throat 64 and decelerate from such throat to the exit 65 at the junction with the static pressure chamber 62.

As the ratio $P_m/P_o$ increases flow through the nozzle 61 is accelerated until the condition indicated in FIGURE 3 has been reached when the air speed at the nozzle throat 64 reaches sonic velocity or Mach number one. At this point an incipient shock wave occurs in the nozzle throat, but because of the divergent character of the nozzle beyond this throat, the air speed begins to decrease and the static pressure to increase immediately beyond the throat, so that no appreciable shock characteristics occur.

As the nozzle pressure ratio increases still further, the flow velocity will still be subsonic up to the throat 64, but at this point the nozzle will "choke" and the air velocity along the nozzle beyond the throat will pass through the sonic into a supersonic zone accompanied by a decrease in static pressure. Despite the expanding cross-sectional area of the nozzle beyond the throat, the air flowing through it will continue to flow at a supersonic velocity until it suddenly reverts to subsonic by means of a compression shock within the nozzle such as at the location 66 in FIGURE 4.

As the ratio $P_m/P_o$ continues to increase, the shock wave moves downstream towards the nozzle outlet.

If the ratio $P_m/P_o$ increases still farther the shock wave front 66 will continue to move toward the exit end of the divergent nozzle section until such wave front coincides with the exit, which is the condition represented in FIGURE 5. Even in this instance the speed of flow through the convergent portion of the nozzle at the entrance side of the throat 64 will remain in the subsonic range, although the velocity is supersonic throughout the divergent section of the nozzle. Consequently, a shock wave will be produced just at the exit of the nozzle, at which point the static pressure will increase abruptly from a value below that in the exit chamber 62 to a value equal to the pressure in such exit chamber.

A still further increase in pressure ratio $P_m/P_o$ will cause the shock wave location 66 to move out beyond the nozzle exit 65 and to assume a frustoconical shape, two examples of which are shown in FIGURES 6 and 7. The velocity in the convergent portion of the nozzle still will be in the subsonic range as indicated. Beyond the exit end of the nozzle the released air will decelerate at different rates. The air nearer the axis of the nozzle will decelerate most abruptly and the conical wave front 66 represents the location of transition between supersonic velocity and subsonic velocity, in directions perpendicular to the local surface portions of such wave front. Along this surface, therefore, there will also be an abrupt increase in static pressure to equal the static pressure of the exit chamber 62, resulting in a shock wave.

As the pressure ratio $P_m/P_o$ is further increased, the condition illustrated in FIGURE 8 will be reached. In this instance the static pressure throughout the entire length of the nozzle 61 will be decreasing, but the static pressure at the nozzle exit will then become equal to ambient static. Thus $P_e = P_o$.

In FIGURE 9 a condition is represented in which the pressure ratio $P_m/P_o$ is higher than in the situation of FIGURE 8. In this instance the outlet absolute static pressure $P_e$ exceeds the ambient static absolute pressure $P_o$ and an expansion wave adjusts the outflow to atmospheric pressure.

FIGURES 2 to 9, inclusive, illustrate generally the velocity phenomena of air flowing through a constricted nozzle. The static pressure associated with supersonic flow also varies as the flow varies, decreasing as the speed of flow increases and increasing as the flow velocity decreases, with an abrupt adjustment to a pressure equal to the air pressure in the chamber beyond the nozzle exit as may be necessary where the air being discharged has a static pressure either lower or higher than the air in the exit chamber. In the utilization of a constricted nozzle as a Mach number sensing device, pressure at the nozzle exit 65 has been used as a controlling factor. Variation in such pressure has been illustrated in FIGURES 10 and 11.

Figure 10:
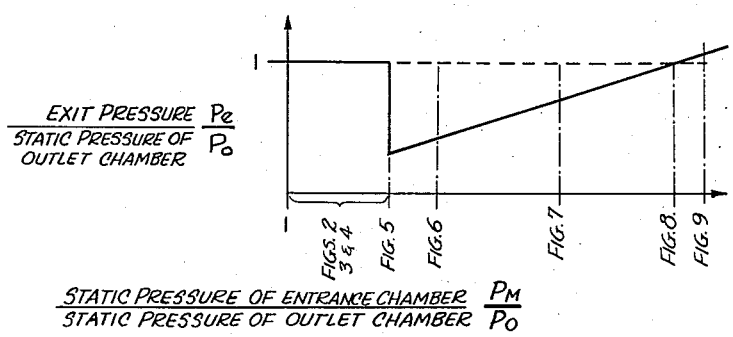
FIGURE 10 is a graph representing theoretical pressure conditions related to the Mach number sensing element of the auxiliary control as represented by the illustrations of FIGURES 2 to 9, inclusive.
Figure 11:
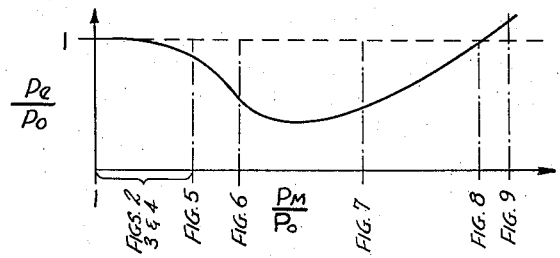
FIGURE 11 is a corresponding graph depicting actual test values of such pressure conditions.

Assuming that the pressure $P_o$ remains constant and only the initial pressure $P_m$ is varied, the graphs of FIGURES 10 and 11 illustrate the variation in static pressure at the nozzle exit produced by a change in the initial pressure or Mach number. If $P_e$ were plotted against $P_m$ the resulting curves would satisfy only changes in aircraft speed at one selected altitude, whereas by plotting $$\frac{P_e}{P_o}$$

against $$\frac{P_m}{P_o}$$

the curves are accurate for various altitudes. It is the ratio of the pressures at the entrance and outlet ends of the nozzle which determines the characteristics of airflow through the nozzle, rather than the quantitative values of such pressures.

FIGURE 10 represents theoretical values of the ratio between the pressure at the exit 65 and the pressure $P_o$ in the outlet chamber. As long as the velocity of flow at the exit of the constricted nozzle is subsonic, as indicated in FIGURES 2, 3 and 4, the static pressure at the exit will be equal to the pressure in the outlet chamber. Since $P_e$ equals $P_o$, $$\frac{P_e}{P_o}$$

is unity, as shown in FIGURE 10. The exit pressure remains constant, therefore, despite changes in the velocity of air at the exit, as long as it is of subsonic character, even though over a portion of the divergent section of the nozzle the velocities may be supersonic. This condition is represented by the bracketed portion of FIGURE 10.

When the shock wave representing the end of the supersonic velocity zone reaches the exit end of the nozzle, as indicated in FIGURE 5, an abrupt drop in pressure at the exit below the air pressure in the outlet chamber occurs, which is represented by the vertical line in FIGURE 10 at the station marked FIGURE 5. The pressure at the exit continues to increase as the inlet chamber pressure increases, as indicated by the upwardly sloping line along the section of FIGURE 10 between the designations FIGURE 5 and FIGURE 8. As previously explained, when the entrance chamber pressure has increased sufficiently so that at the exit end of the constricted nozzle the pressure of the moving air is the same as the static pressure of the air in the outlet chamber, the shock wave vanishes, and the ratio of $P_e$ to $P_o$ is again unity.

It will be seen, therefore, that if a selected critical or predetermined maximum Mach No. can be related to the transition condition represented by FIGURE 8, a very accurate sensing of such Mach number can be obtained. This is true not only in theory but has been proven to hold in practice. FIGURE 11 represents a graph of values of the ratio $$\frac{P_e}{P_o}$$

obtained experimentally. While the drop in pressure at the exit did not occur as abruptly at the condition of FIGURE 5 as would be indicated by FIGURE 10, this portion of the curve is of no significance as far as the characteristic of the constricted nozzle used for sensing Mach number is concerned. Note that as the pressure in the entrance chamber over the pressure in the outlet chamber has increased to produce the condition illustrated in FIGURE 8, the line of the graph has become virtually straight and crosses the line representing $$\frac{P_e}{P_o}$$

equals one at a substantial angle, so that the transition condition represented by FIGURE 8 is shown to be critical.

To make practical use of the phenomenon of flow through a constricted nozzle of the convergent-divergent type discussed above to sense Mach number, a duct 68 is connected between the exit of the constricted nozzle 61 illustrated in FIGURE 1 and a chamber 7 at one side of diaphragm 70 formed in a bleed control unit 71. To the chamber 72 at the opposite side of the diaphragm 70 is connected the outlet chamber 62 of the nozzle unit 6 by a duct 69. To the diaphragm 70 is connected the valve unit 73 slidable lengthwise of the bore 74 by flexure of the diaphragm. The valve action is produced by the cooperation of the body 73 with an annular groove 75 in the bore 74, to which a static pressure or atmosphere conduit 76 is connected. The valve also has a piston 77 slidable in the bore 74 to guide the valve for precise linear movement. A conduit 14 interconnects the conduit 11, supplying impact air pressure from the probe pickup to the primary control mechanism, and a portion of the valve casing 71 containing bore 74 between the groove 75 and the piston 77.

At Mach numbers producing in the entrance chamber 60 pressures which will not raise the flow at the nozzle exit 65 above sonic velocity, the pressure transmitted to the diaphragm chamber 7 through duct 68 will be substantially the same as the air pressure in diaphragm chamber 72 transmitted to it through duct 69. The diaphragm 70 will therefore tend to remain substantially centered, in which position valve 73 will just close one edge of the annular groove 75. As the pressure ratio $$\frac{P_m}{P_o}$$

increases, the pressure in chamber 7 will decrease so that the valve 73 will be shifted so that piston 77 travels toward an adjustable stop screw 78 threaded into the end of the valve casing 71 for abutment by such piston. Such movement is effected solely by the differential pressure in chambers 7 and 72 acting on opposite sides of the diaphragm, because the pressure is equalized between the chamber 72 and the chamber formed at the side of the piston 77 remote from the valve through the axial duct 79 in the valve 73 and its stem.

As the aircraft Mach number continues to increase, the superiority of pressure in chamber 72 over the pressure in chamber 7 will decrease until the condition represented by FIGURE 8 in the constricted nozzle 61 has been reached. At this point the pressure differential acting on diaphragm 70 will reverse by the pressure in chamber 7 exceeding the air pressure in chamber 72. Thereupon deflecting of diaphragm 70 by such pressure differential will move valve 73 in the opposite direction to produce an opening between valve 73 and the annular corner of groove 75 with which it cooperates. As the valve is thus opened, air will be bled through conduit 14 from the probe impact pressure conduit 11 leading to the fuel control mechanism which will result in a decrease in differential pressure in chambers 20 and 21, acting on diaphragm 22. Spring 36 will consequently move valve 3 toward closed position to reduce the flow of fuel to the engine, which will effect a leaner mixture.

As has been discussed previously, reducing the fuel-to-air ratio of the combustible mixture will result in a decrease of engine thrust so that the speed of the aircraft will be reduced. To prevent the possibility of the jet engine fire being blown out because the mixture is too lean, however, too great a reduction in the supply of fuel should be prevented. This can be accomplished by limiting the amount of air bled from the impact pressure line 11 through conduit 14 past valve 73. Such a limitation on the withdrawal of air may be effected conveniently by restricting the amount of travel of valve 73, such as by providing an abutment which it contacts upon predetermined movement in the valve opening direction. Such abutment is illustrated in FIGURE 1 as the screw 8, the position of which may be adjusted to regulate the terminal position of valve movement, and consequently the lower limit of fuel-to-air ratio of the combustible mixture.

It is possible that in order to prevent the fuel-to-air ratio being too low the thrust developed by the engine operating at such a mixture may be sufficient to maintain an aircraft speed somewhat in excess of the Mach number corresponding to the conditions of FIGURE 8. At such a Mach number, however, the pressure in chamber 7 of the Mach number limiting control will exceed the pressure in chamber 72 so that the diaphragm 70 will be held in its position corresponding to the lean limit open position of valve 73. Nevertheless, the flight of the aircraft will soon stabilize at such slightly higher Mach number and the fuel-to-air ratio will remain constant at such lean limit value. The aircraft will then continue to fly at such speed until the quantity of fuel to air delivered to the engine is reduced.

It will be evident that the lean limit of mixture control can be established by adjustment one way or the other of screw 8. Also, the critical or maximum Mach number for which the Mach number limiting control is operative may be selected by altering the axial position of the tapered rod 63 extending through the throat of the constricted nozzle. Such adjustment is effected by rotating the threaded screw 63′ relative to the block 6.

As the tapered rod is moved, the ratio between the area of the exit 65 and the throat 64 is altered. The larger the ratio of the area of throat 64 to the area of exit 65, the lower will be the Mach number of the aircraft to produce flow and pressure conditions in the constricted nozzle illustrated in FIGURE 8 and, conversely, the lower the ratio of throat area to exit area, the higher will be the aircraft Mach number necessary to produce such flow and pressure conditions in the constricted nozzle. Alternatively, of course, a nozzle of appropriately different design may be substituted for different critical Mach number operations to be selected instead of utilizing the adjustable type of constricted nozzle shown in the drawing.

A characteristic phenomenon of relatively low velocity flow of a compressible fluid through a fixed piping system upstream of a "choke" is that the pressures at locations upstream of such choke vary in equal proportions regardless of wide variations in such pressure values. This phenomenon has been used in this invention to effect an automatic control of fuel-air ratio of the ramjet engine according to a different formula for each of two flight regimes, namely (1) accelerated flight and (2) constant maximum Mach number of flight.

A more thorough understanding of the operation of the invention can be obtained from the analysis presented below where:

$P_m$=Impact pressure
$P_{20}$=Pressure within chamber 20
$P_{21}$=Pressure within chamber 21
$P_t$=Pressure at juncture of lines 11 and 14
$K_1$=Proportionality factor of $P_t$ to $P_m$ with valve 73 open to stop 8
$K_2$=Proportionality factor of $P_{21}$ to $P_{20}$ As explained before in reference to operation of the primary fuel control, the fuel flow rate is varied in accordance with the controlling force as measured by the difference in pressure across diaphragm 22. Thus:

$$\text{Controlling force} \approx P_{20} - P_{21}$$

Because of the phenomenon mentioned above, $$P_t = K_1 P_m \text{ and}$$
$$P_{21} = K_2 P_{20}$$

When the aircraft is flying at speeds below the critical Mach number valve 73 is closed and the fuel valve controlling force is determined by the following:

$$P_{20} = P_t = P_m \text{ and } P_{21} = K_2 P_{20}$$

$$\text{Controlling force} \approx P_{20} - P_{21} = P_{20} - K_2 P_{20}$$
$$\approx P_m(1 - K_2)$$

In this range of operation the control force is directly proportional to $P_m$ with the factor $(1-K_2)$ variable at will by adjustment of the valve 25.

When the aircraft reaches the critical Mach number and valve 73 is opened to stop 8 the fuel valve controlling force is now determined by the following formulae:

$$P_t = K_1 P_m, \; P_t = P_{20}$$
$$P_{21} = K_2 P_{20}$$

$$\text{Controlling force} \approx P_{20} - P_{21} = P_{20} - K_2 P_{20}$$
$$= P_{20}(1 - K_2)$$
$$= P_t(1 - K_2)$$
$$= K_1(1 - K_2) P_m$$

In this range of operation, the control force is also directly proportional to $P_m$ but at a new proportion $K_1(1-K_2)$ in which range the operation can be varied by adjusting lean limit stop screw 8 which varies $K_1$ and by adjusting valve 25 which varies the factor $K_2$.

I claim as my invention:

1. Fuel flow control mechanism adapted to control the flow of fuel to the propulsion device of an aircraft, comprising fuel flow regulating means, actuating means operatively connected to said fuel flow regulating means and including first pressure responsive means, first air supply means operable to supply air under pressure to said first pressure responsive means, a Mach No. responsive device including second air supply means operable to supply air substantially at flight impact pressure of the aircraft, a constricted nozzle of the convergent-divergent type having its entrance in communication with said second air supply means for receiving air under pressure therefrom and discharging such air to a substantially lower pressure region, second pressure responsive means, means establishing communication between said second pressure responsive means and the exit of said constricted nozzle for actuating said second pressure responsive means, and means controlled by said second pressure responsive means and operable to control said first air supply means for reducing the pressure of the air supplied thereby to said first pressure responsive means upon the aircraft exceeding a predetermined Mach No. for altering the actuation of said fuel flow regulating means to reduce the flow of fuel therethrough to the aircraft propulsion device.

2. The fuel flow control mechanism defined in claim 1, and means operable to vary the area relationship between the exit of such nozzle and its throat to select a different Mach No. value exceeding of which by the aircraft will induce a response by the second pressure responsive means operable to control the first air supply means for reducing the pressure of the air supplied thereby to the first pressure responsive means.

3. The fuel flow control mechanism defined in claim 1, and a tapered rod extending through the throat portion of the constricted nozzle and movable lengthwise to vary the area relationship between the exit of such nozzle and its throat to select a different Mach No. value exceeding of which by the aircraft will induce a response by the second pressure responsive means operable to control the first air supply means for reducing the pressure of the air supplied thereby to the first pressure responsive means.

4. Fuel flow control mechanism adapted to control the flow of fuel to the propulsion device of an aircraft comprising fuel flow regulating means, actuating means operatively connected to said fuel flow regulating means and including a casing, a pressure differential responsive element received in said casing, operatively connected to said fuel flow regulating means and operable to effect movement thereof and defining in said casing at one side thereof a low pressure chamber and at the other side thereof a high pressure chamber, means operable to supply air substantially at flight impact pressure of the aircraft and connected to said high pressure chamber for supplying air under pressure thereto, a constricted bleed nozzle of the convergent-divergent type communicating with said high pressure chamber for escape of air therefrom and having a throat-to-exit area relationship such as readily to produce sonic velocity in its throat, means establishing communication between said low pressure chamber and the throat of said constricted bleed nozzle for establishing within said low pressure chamber pressures bearing a substantially constant proportional relationship to the pressures in said high pressure chamber as the pressure in said high pressure chamber varies when the speed of air flowing through the throat of said constricted bleed nozzle in sonic, a Mach No. responsive device operable automatically in response to changes in the Mach No. of the aircraft, and means controlled by said Mach No. responsive device and operable to bleed air from said air supply means for reducing the pressure of the air supplied thereby to said high pressure chamber upon the aircraft exceeding a predetermined Mach No. for altering the actuation of said fuel flow regulating means to reduce the flow of fuel therethrough to the aircraft propulsion device.

5. The fuel flow mechanism defined in claim 4, in which the Mach No. responsive device includes a constricted nozzle of the convergent-divergent type discharging air to a region at a pressure substantially lower than flight impact pressure, air supply means operable to supply air substantially at flight impact pressure of the aircraft to the entrance of said Mach No. responsive device constricted nozzle, the means controlled by the Mach No. responsive device including pressure responsive means, and means establishing communication between said Mach No. responsive device pressure responsive means and the exit of said Mach No. responsive device constricted nozzle for actuating said Mach No. responsive device pressure responsive means to bleed air from the first air supply means.

References Cited in the file of this patent

UNITED STATES PATENTS

| | | |
|---|---|---|
| 2,051,307 | Lorraine | Aug. 18, 1936 |
| 2,367,544 | Udale | Jan. 16, 1945 |
| 2,496,294 | Kellog | Feb. 7, 1950 |
| 2,540,594 | Price | Feb. 6, 1951 |
| 2,564,127 | Orr | Aug. 14, 1951 |
| 2,636,553 | Ballantyne | Apr. 28, 1953 |
| 2,638,739 | Barr | May 19, 1953 |
| 2,642,237 | Page et al. | June 16, 1953 |
| 2,872,133 | Seeger | Feb. 3, 1959 |

UNITED STATES PATENT OFFICE
CERTIFICATE OF CORRECTION

Patent No. 3,022,964             February 27, 1962

Bernard I. Seeger

It is hereby certified that error appears in the above numbered patent requiring correction and that the said Letters Patent should read as corrected below.

Column 16, line 13, for "in sonic" read -- is sonic -- .

Signed and sealed this 28th day of August 1962.

(SEAL)
Attest:

ESTON G. JOHNSON             DAVID L. LADD

Attesting Officer             Commissioner of Patents